(12) United States Patent
Bentvelzen et al.

(10) Patent No.: US 8,463,657 B1
(45) Date of Patent: Jun. 11, 2013

(54) SELF-HELP SYSTEM AND METHOD FOR SELLING FOOTWEAR

(76) Inventors: Joe Bentvelzen, Edgewood, WA (US); Douglas Gillis, Las Cruses, NM (US)

( * ) Notice: Subject to any disclaimer, the term of this patent is extended or adjusted under 35 U.S.C. 154(b) by 206 days.

(21) Appl. No.: 12/897,582

(22) Filed: Oct. 4, 2010

Related U.S. Application Data

(60) Provisional application No. 61/319,992, filed on Apr. 1, 2010.

(51) Int. Cl.
*G06Q 30/00* (2012.01)
(52) U.S. Cl.
USPC .......................... 705/26.1; 705/27.1; 36/25 R
(58) Field of Classification Search
USPC .................................. 705/26.1, 27.1; 36/25 R
See application file for complete search history.

(56) References Cited

U.S. PATENT DOCUMENTS
8,079,159 B1 * 12/2011 Rosa ............................. 36/25 R

OTHER PUBLICATIONS
Light Hikers, Lanza, Michael, Backpacker, published Aug. 2005, downloaded from ProQuestDirect on the Internet on Dec. 1, 2012, 3 pages.*

* cited by examiner

*Primary Examiner* — James Zurita
(74) *Attorney, Agent, or Firm* — Dean A. Craine

(57) ABSTRACT

A system and method of selling and distributing custom-fit shoes by a footwear manufacturer or seller. Each footwear includes a shoe shell with a foot bed cover, an arch support member, and an upper foot bed cover. Pad pockets are formed on the inside surfaces of the shoe's medial and lateral sides and on the tongue. Distributed with each shoe shell is a fit adjustment kit with a plurality of arch support pads, medial pads, lateral pads, forefoot pads, and tongue pads. The kit includes several sizes of arch support pads, medial pads, lateral pads, and tongue pads thereby enabling the user to interchange them and adjust the fit for optimal comfort. The fit of each shoe shell in a pair of footwear can be adjusted independently. The method of selling shoes includes a creation of a website where a plurality of different styles and sizes of shoes with fit adjustment kits are offered for sale.

4 Claims, 15 Drawing Sheets

SELF-HELP SYSTEM AND METHOD FOR SELLING FOOTWEAR

This is a utility patent application which claims benefit of U.S. Provisional Application No. 61/319,992, filed on Apr. 1, 2010.

COPYRIGHT NOTICE

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention relates to an improved method of selling and manufacturing footwear, and more particularly, to a method of selling footwear online and then custom fitting each shoe to the customer's feet.

2. Description of the Related Art

It is widely known that foot sizes and shapes vary greatly from individual to individual. It is also widely known that the length, width, size and location of bunions and calluses on an individual's feet also vary. Unfortunately, most pairs of shoes sold are identical in size and do not take into consideration the variations in an individual's feet.

Today, footwear retailers must carry hundreds of pairs of shoes in different styles and sizes. The number of pairs of shoes of a particular style usually follows a bell curve with the smallest and largest sizes located on opposite ends of the bell curve and the most common sizes located in the middle. In order to reduce their inventory, most footwear retailers carry large quantities of shoes in the most common sizes and small quantities of shoes in small and large sizes. Customers with small or large feet who prefer a large selection of shoes must find footwear retailers that carry larger inventories of small or large size shoes or place special orders for their shoes and wait for shoes to be shipped to them.

Approximately 30% of shoes purchased by customers who buy online today are returned to the retailer. A large percentage of the returns are due to discomfort that many believe could have been identified and addressed at the time of purchase. Unfortunately, many customers purchase shoes based on appearance and not on comfort and support. Even when discomfort is experienced, many customers attribute the discomfort to general stiffness and mistakenly believe that the discomfort will gradually dissipate when the shoes are worn and 'broken in'. Later, after wearing the shoes for several days and realizing that the discomfort is not dissipating, the customer decides to return the shoes or discards them.

Changes are being made throughout the retail industry to reduce the costs of goods. While manufacturing and shipping costs are important factors that influence the price of the goods, how goods are packaged, distributed and sold are also important factors. Examples of changes in the retail industry regarding how goods are packaged, distributed and sold are seen in the rising popularity of warehouse retail outlets, self-help discount stores and home improvement centers.

In addition to these changes, ordering merchandise over the Internet from online retail websites has become very popular. Unfortunately, online shoe retailers must confront the problem of customers not being able to 'try on' the shoes prior to purchasing them. As a result, some online shoe retailers will deliver several shoes of a particular style made in different sizes to a customer who, after 'trying on' the shoes, will select one pair and then return the other pairs to the online shoe retailer. Obviously, the cost of shipping the returned pairs of shoes is inefficient and increases the overall costs of the shoes. Many customers who may not be completely satisfied with the pair of shoes they ordered after they have been delivered, will accept the shoes out of a feeling of responsibility or an obligation to the online shoe retailer. As a result, many customers who purchased footwear from an online shoe retailer are dissatisfied and 'turned off' by the experience.

What is needed is an improved method of selling and distributing shoes that: (1) allows a customer to purchase shoes on a 'self help' basis either from a website or a retail store; (2) allows a shoe retailer to reduce the number of sizes offered for a particular style of shoe which thereby allows the shoe retailer to offer greater varieties of different styles of shoes; and (3) reduces the number of shoes being returned due to an improper fit or support.

SUMMARY OF THE INVENTION

These needs are addressed by a system and method for selling and distributing shoes disclosed herein that includes the sale of customizable footwear that includes a pair of shoe shells each with a lower foot bed covered by a longitudinally aligned rigid or semi-flexible arch support member and a forefoot pad. Disposed over the arch support member and the forefoot pad is a replaceable upper foot bed cover. The arch support member may be used by itself or may be used with an arch support pad placed under the arch support member to provide additional support and comfort. In one embodiment, the arch support pad may be small structure positioned under the arch section on the arch support member or it may be a larger structure integrally formed or attached to a full or ¾ length foot bed cover.

The shoe shells are available in a wide variety of styles. If the shoe shell includes medial and lateral side walls and on a tongue, pockets may be formed on the side walls and tongue that are designed to receive complimentary-shaped foam pads. The pads come in different sizes and shapes and are designed to fill voids and spaces between the side walls and the tongue and the user's foot thereby providing support and controlling the fore-to-aft and side-to-side movement of the foot in the shoe shell when worn. A plurality of pocket pads are distributed in a pad adjustment kit with each shoe shell. A plurality of arch support pads may also be included in each pad adjustment kit. During use, the customer selects a particular style and size of shoe shell. Accompanying each shoe shell is an arch support member, a forefoot pad, a pad adjustment kit, and at least one upper foot bed cover. If the shoe shell includes side and tongue pockets, the pad adjustment kit may include a plurality of pocket pads. Each pad adjustment kit includes a plurality of replaceable arch support pads. As each shoe shell is worn and 'broken in', the pocket and arch support pads easily exchanged so that comfort and support is maintained.

The customizable footwear may be sold and distributed in online or retail stores. When a customer visits the online store's website or the retail store, the customer may print out the template of the foot measurement graph and measure the length of each foot. The customer presents the length measurement amount to the online order fulfillment or the retail representative. The representative then removes the pair of shoe shells from inventory along with a pair of covers and pad adjustment kits designed for the pair of shoes and delivers them to the customer. The customer then selects and inserts the lower and upper fore foot covers, the optimal arch support pads and the medial and lateral side pads, and the tongue pad in the two shoe shells to achieve the desired comfort and support.

DESCRIPTION OF THE PREFERRED EMBODIMENT(S)

Figure 1:
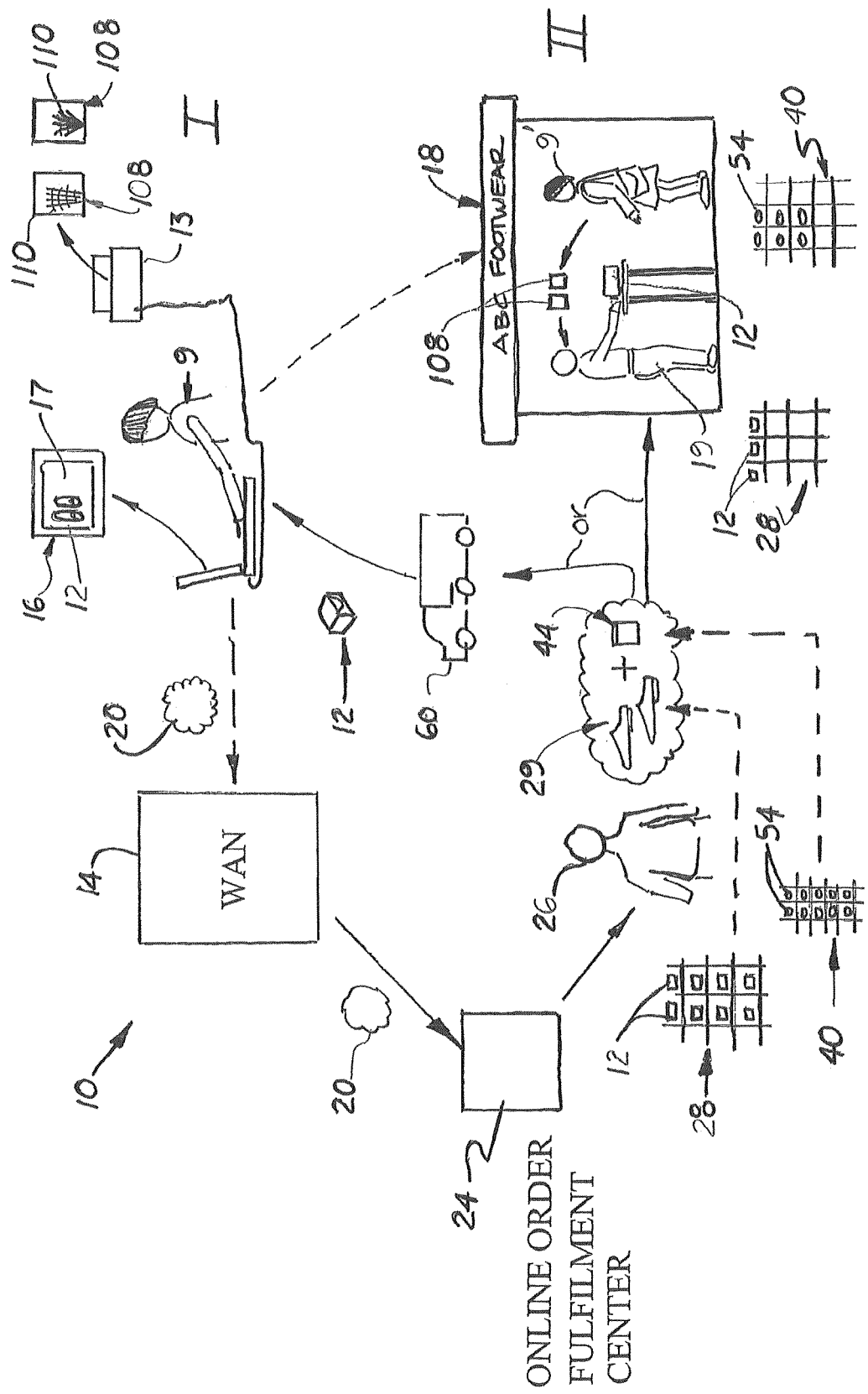
FIG. 1 is an illustration showing a customer ordering a pair of shoes from an online retailer who fills the order with the custom footwear disclosed herein and then either directly delivers the footwear directly to the customer or delivers the footwear to a nearby store for pickup by the customer.

Referring to the accompanying FIGS. 1-19, there is shown a system 10 and a method of selling and distributing a pair of customizable-fit footwear 12 to customers 9 who visit an online retailer's website 16 accessed over a wide area network 14 or who visit the retailer's physical store 18. Both the website 16 and the physical store 18 have a plurality of different styles and sizes of customizable footwear 12 for sale. Each footwear 12, which is sold in a pair, includes an outer shoe shell 30 with a lower foot bed 32. Located longitudinally over the lower foot bed 32 is a removable rigid or semi-flexible, ¾ length instep arch support member 44 and a forefoot pad 42. Disposed longitudinally over the arch support member 42 and fore foot pad 44 is an upper foot bed cover 50. In the embodiment shown in the Figs., the shoe shell 30 includes a medial side wall 31, a lateral side wall 33 and a tongue 38. It should be understood, however, that the side walls 31 and 33 and tongue 38 are not required structures and that the system 10 and method may be used with shoe shells that do not include side walls and a tongue.

FIG. 1 shows both the online and retail store scenarios, indicated by the reference symbols I and II, in which the customers 9, 9' place orders for custom footwear 12 from a website 16 or from a physical store 18, respectively. For the online scenario I, the customer 9 submits an order 20 for footwear 12 that is transmitted in a wide area network 14 to an order fulfillment center 24. At the order fulfillment center 24, a center's representative 26 reviews the order 20 and then pulls the selected footwear 12 from the center's footwear inventory 28. As stated above, each footwear 12 includes two pairs of shoe shells 30 and two pad adjustment kits 54. The center's representative 26 sends one pair of selected footwear 12 with their accompanying pad adjustment kits 54 directly to the customer 9 via truck 69 or sends to a nearby retail shoe store 18 for pickup by the customer 9. For retail store scenario II, the retail salesperson 19 receives a request from the customer 9' and then pulls the footwear 12 and the pad adjustment kit 54 from the store's inventory, 28, 40, respectively.

Figure 2:
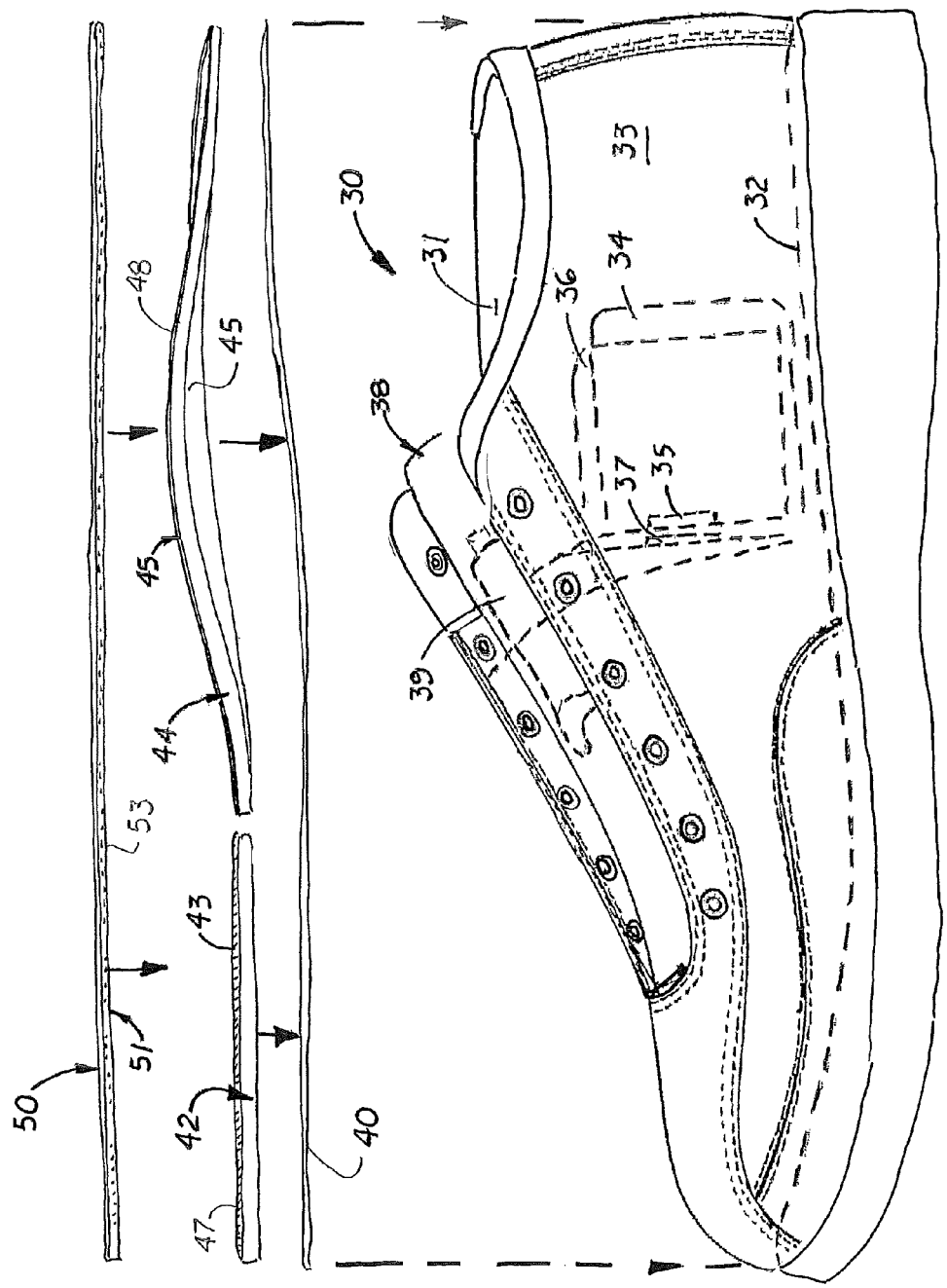
FIG. 2 is an illustration of a shoe shell with a lower foot bed cover, the forefoot pad, the arch support member, and the upper foot bed cover and showing a shoe shell with side walls and a tongue with pad pockets formed thereon.

As shown more clearly in FIG. 2, each shoe shell 30 includes a longitudinally aligned lower foot bed 32 and may include a medial side wall 31 and a lateral side wall 33. The footwear 12 may also include an optional tongue 38 that covers the instep region of the foot when worn. Disposed inside the shoe shell 30 and over the lower foot bed 32 is a thin, full-length lower foot bed cover 40. Disposed over the foot bed cover 40 is a front forefoot pad 42 and a ¾ instep arch support member 44. Disposed over the forefoot pad 42 and the arch support member 44 is a thin, replaceable upper foot bed cover 50.

When the shoe shell 30 includes a medial side wall 31 and a lateral side wall 33, at least one medial side pocket 34 and at least one lateral side pocket 36, may be faulted on the medial side wall 31 and the lateral side wall 33, respectively. When a tongue 38 is provided, the tongue 38 may include an optional tongue pocket 39.

Figure 3:
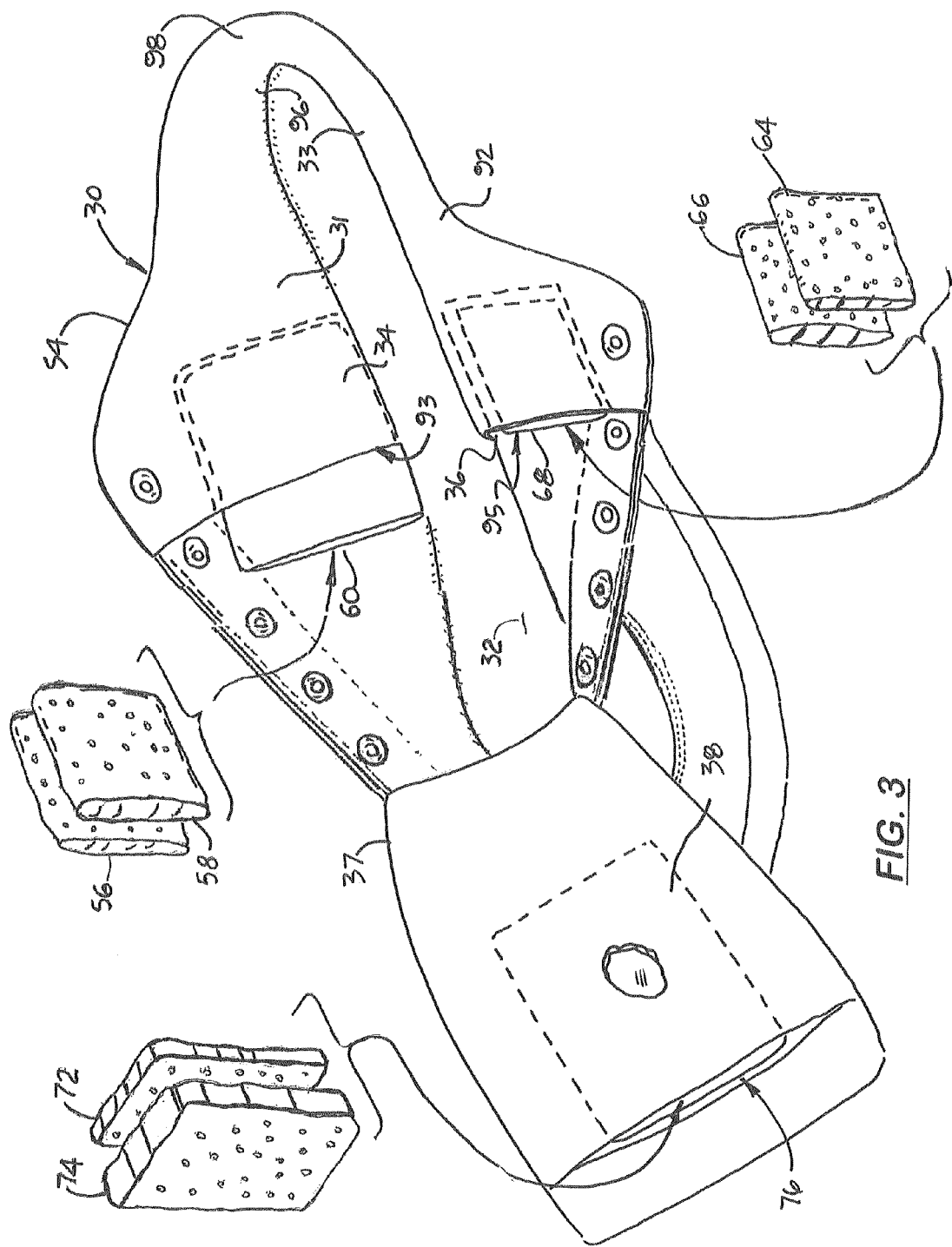
FIG. 3 is a perspective view of the shoe shell shown in FIG. 2 showing the relative locations of the side and tongue pads in the medial, lateral and tongue pockets, respectively.

In the embodiment shown in FIG. 3, the pockets 34 and 36 are formed by an elastic inner liner 92 that wraps continuously around the rear, inside surface of the shoe shell 30. The inner liner 92 is attached along its upper and lower edges 94, 96 and along the heel counter 98. Two vertical side openings 93, 95 are formed in the ends of the inner liner 92 on the medial side 31 and lateral side 33, respectively, of the shoe shell 30. During use, the ends of the inner liner 92 can be manually pulled inward thereby increasing the side of the openings so that a side pad maybe easily inserted or removed from them. Optional hook and loop connectors 34A, 36A, 39A may be provided along the opening of each pocket 34, 36, 39 that enables them to be selectively closed.

Figure 4:
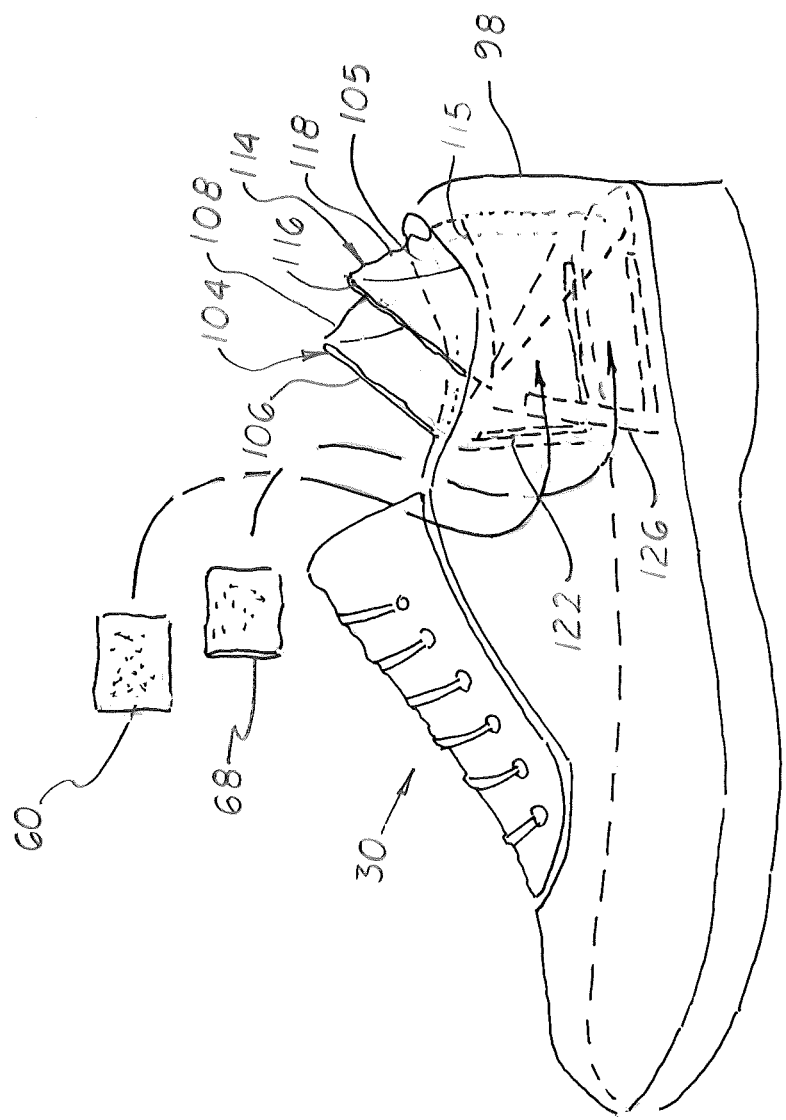
FIG. 4 is a side elevational view of a shoe shell similar to the shoe shell shown in FIGS. 2 and 3 with two side pocket flaps selectively attached along two edges to the inside surfaces of the shoe shell that enable them to be lifted so that the pocket pads may be inserted under them.
Figure 5:
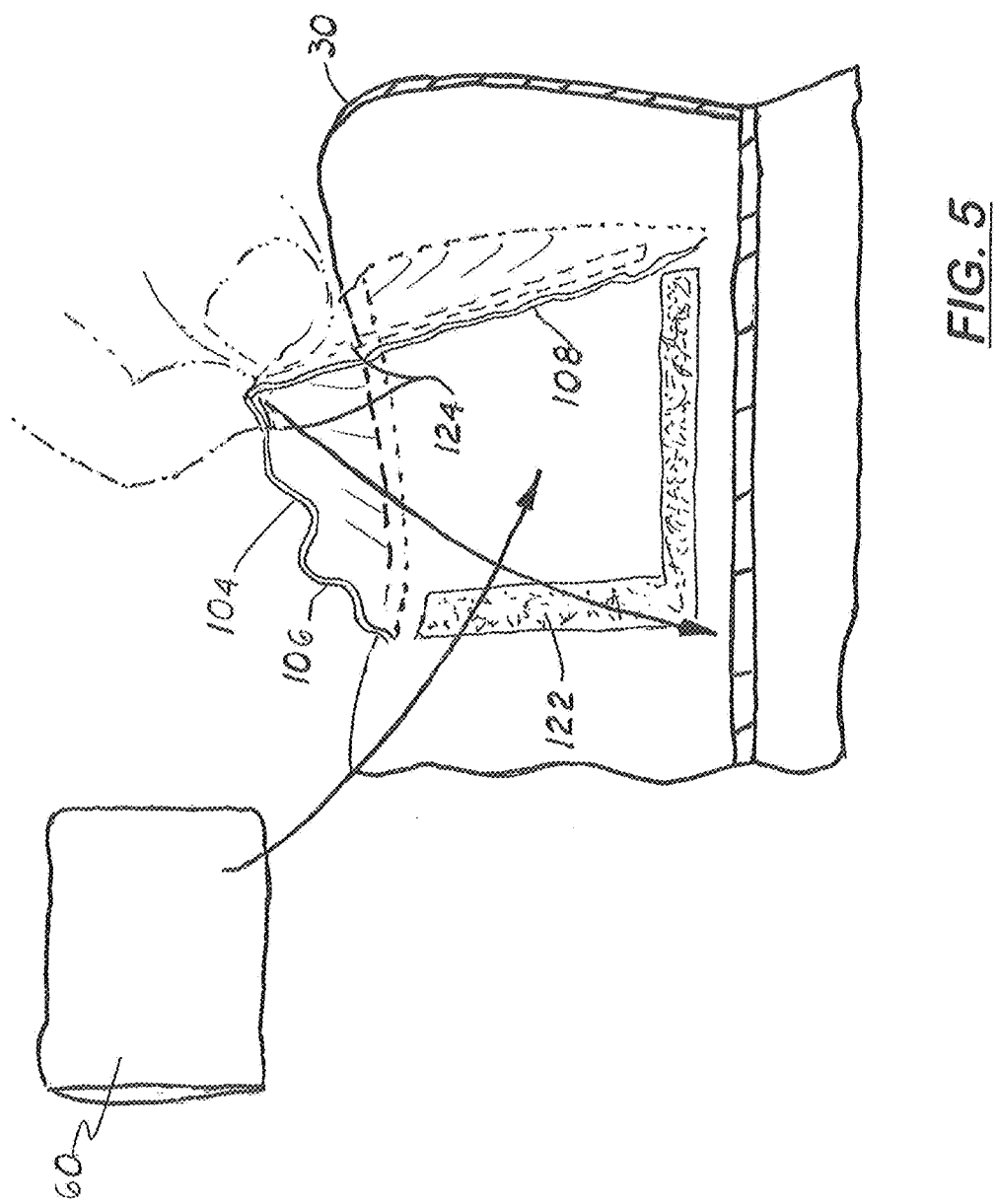
FIG. 5 is an expanded, partial side elevational view of the shoe shell shown in FIG. 4, showing the flap being pulled upward so that a pad may be inserted there under and showing relatively locations of the hook and loop connector strips along the detachable edges of the flap and the inside surface of the shoe shell's side wall.

In another embodiment shown in FIGS. 4 and 5, the single inner liner 92 is replaced by two pocket flap covers 104, 114. The top and rear edges 105, 115 of the flap covers 104, 114 are sewn or adhesively attached to the shoe shell's top edge and heel counter 98, respectively, in the shoe shell 30. The front and lower edges 106, 116 of each flap cover 104, 11, respectively, are detached from the shoe shell 30. Disposed between the inside side surfaces of the shoe shell 30 and the inside surfaces of each pocket flap cover 104, 114 is a hook and loop strip 122, 126, respectively, that allows the flap covers 104, 114, to be pulled upward from the shoe shell 30 to insert or remove a pocket pad 60, 68. The flaps covers 104, 114 are then folded downward over the pocket pads 60, 68 and held in position by the hook and loop strips 122, 126, respectively.

Figure 7:
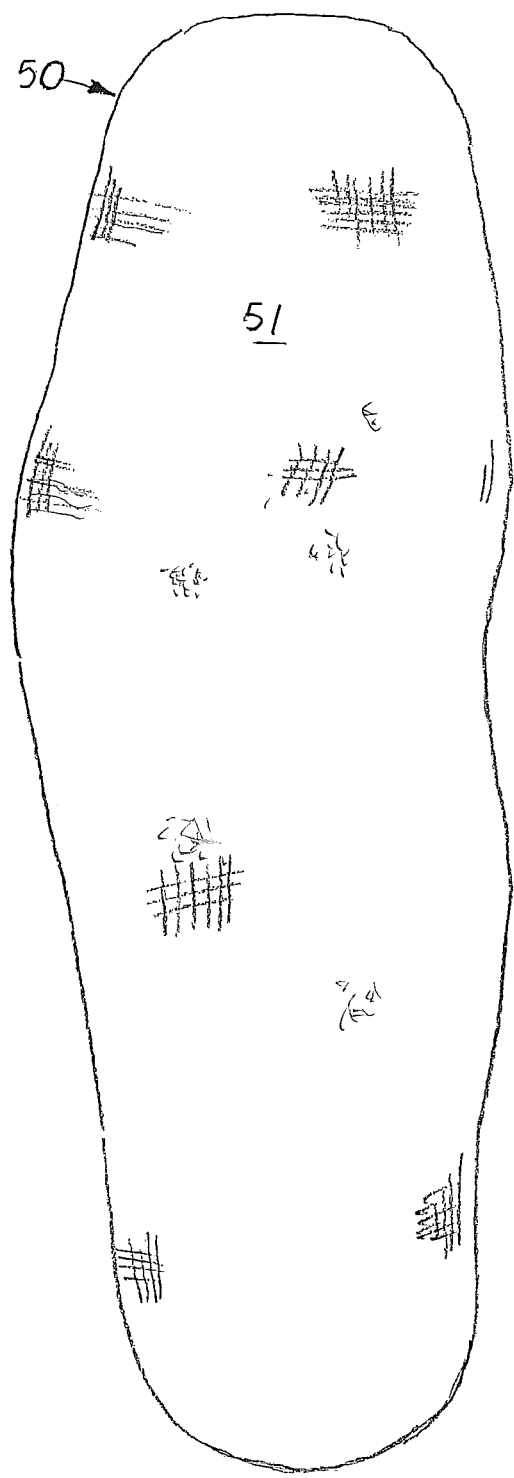
FIG. 7 is a top plan view of the replacement upper foot bed cover.
Figure 8:
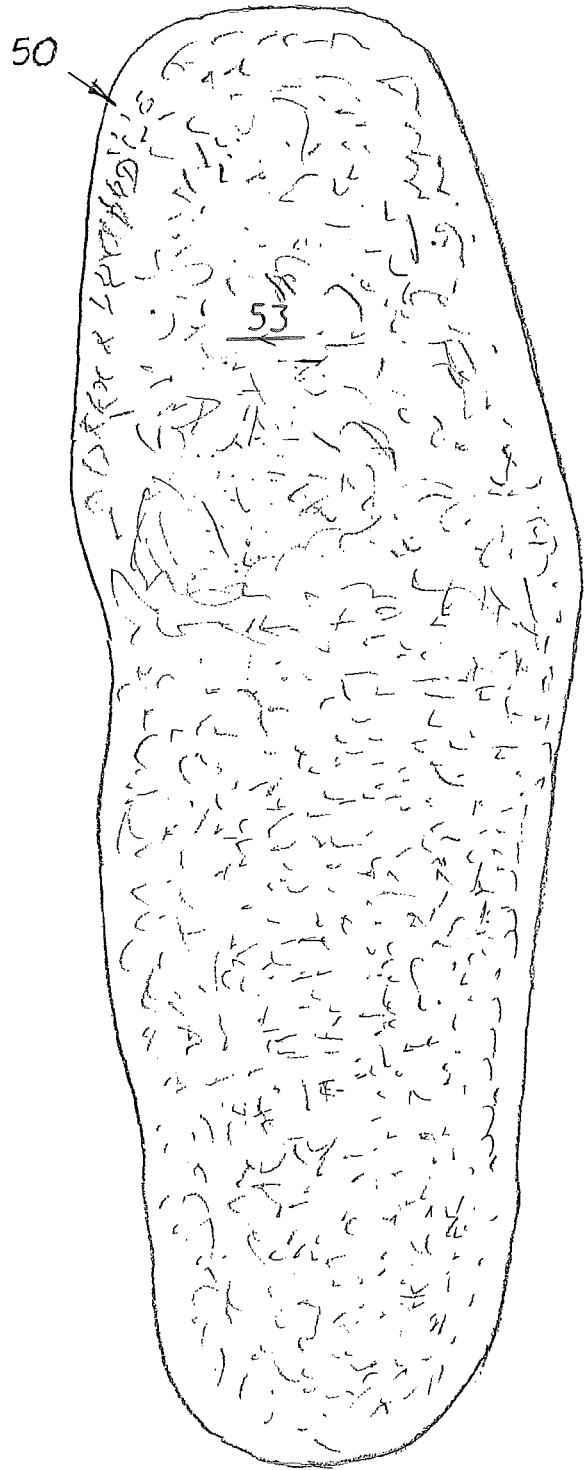
FIG. 8 is a bottom plan view of the upper foot bed cover shown in FIG. 7.
Figure 9:
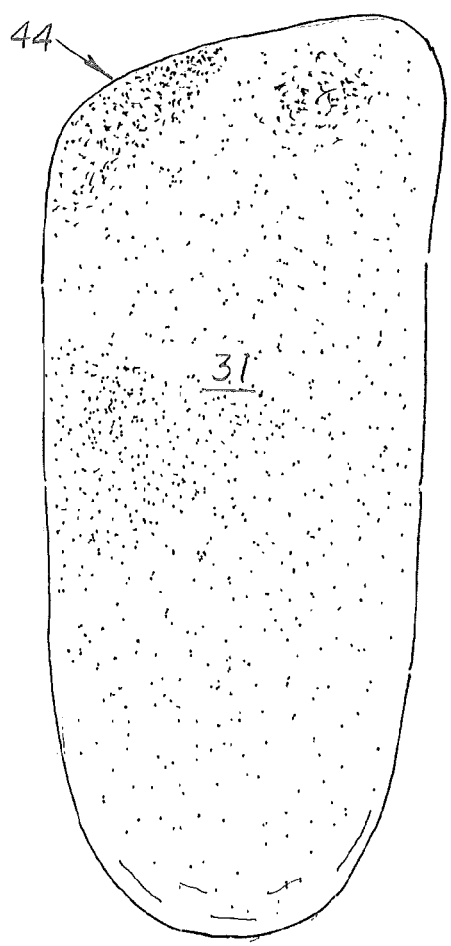
FIG. 9 is a top plan view of the ¾ length instep arch support member.

As stated above, disposed over the forefoot pad 42 and the arch support member 44 is a replaceable upper foot bed cover 50. As shown in FIGS. 2, 7 and 8, attached to the top surfaces 43, 45 of the forefoot pad 42 and the arch support pad member 44 and the bottom surface 51 of the upper foot bed cover 50 are hook and loop layers 47, 48, and 53, respectively, designed to hold the upper foot bed cover 50 in place over the forefoot pad 42 and the arch support pad member 44. The upper foot bed cover 50 is made of inexpensive, moisture resistant material and intended to be easily replaced at regular intervals (i.e. every three to six months).

Figure 6:
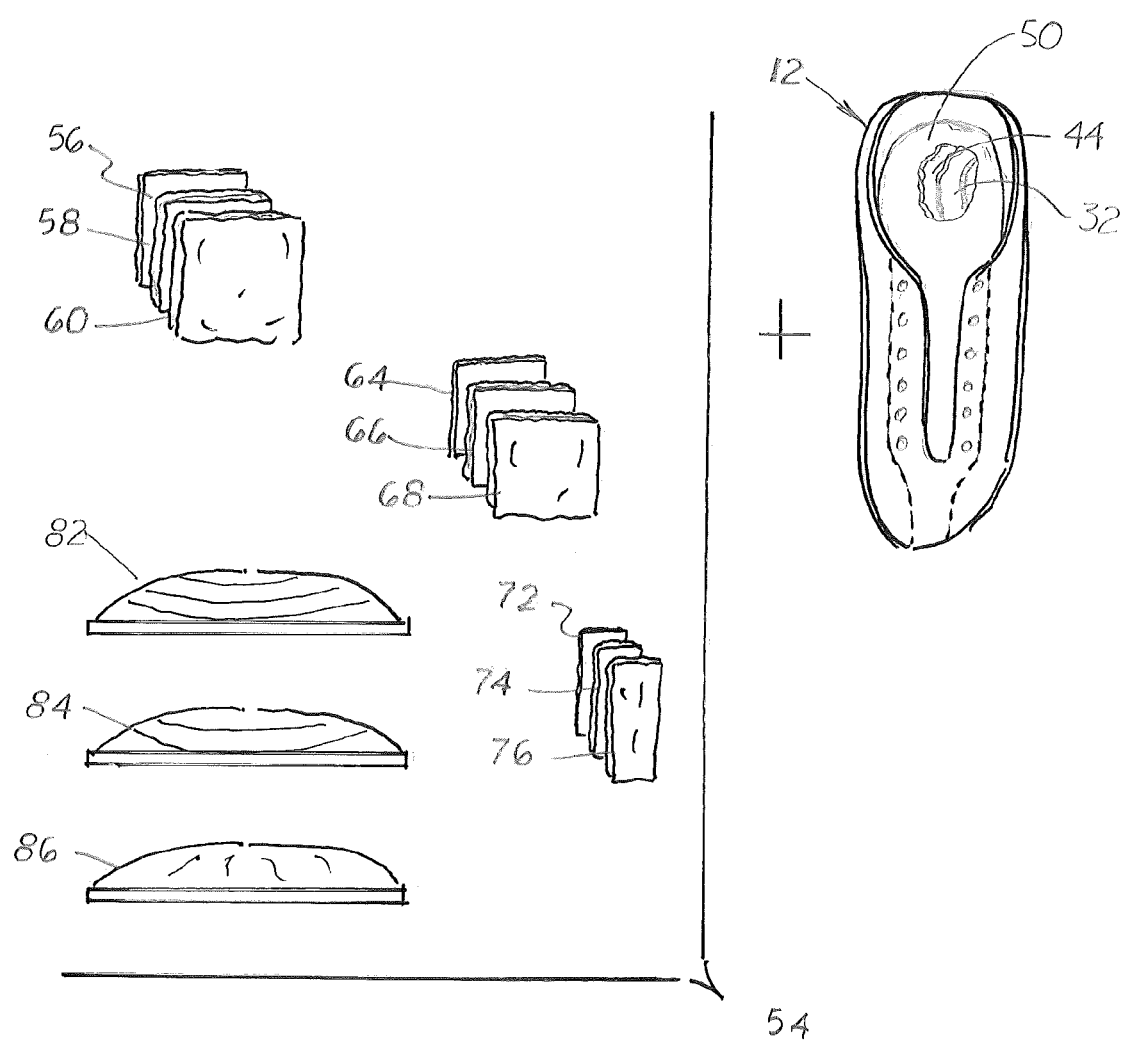
FIG. 6 is an exploded view of a shoe shell with a lower foot bed, an arch support member, an upper foot bed cover and its accompanying adjustment pad kit containing a plurality of side and tongue pads and a plurality of arch support pads.

Distributed with each shoe shell 30 is a pad adjustment kit 54. As shown in FIG. 6, when the shoe shell 30 includes side pockets 34, 36 and a tongue 38, the pad adjustment kit 54 contains a plurality of exchangeable pocket pads 56, 58, 60, 64, 66, 68 or a plurality of arch support pads 82, 84, 86. In one embodiment, the kit 54 may contain both the pocket pads 56, 58, 60, 64, 66, 68 and arch support pads 82, 84, and 86. As stated above, the pocket pads 56, 58, 60, 64, 66, 68 are designed to be inserted into pockets 34, 36 and 39 that may be formed on the shoe shell 30. The pad adjustment kit 55 may also include a plurality of tongue pads 72, 74, 76 designed to selectively slide into the tongue pocket 38 formed on the tongue 38. As stated above, the pocket pads 56, 58, 60, 64, 66, 68 and 72, 74, and 76 are used to fill voids and to conform the inside surface of the shoe shell 30 to the customer's foot and thereby provide support and control the fore-to-aft and side-to-side movement of the foot in the shoe shell 30 when worn.

The individual medial pads 56, 58, 60, lateral pads 64, 66, 68 and the tongue pads 72, 74, 76 vary in thickness, shape and dimensions. The pads 56, 58, 60 64, 66, 68, 72, 74, and 76 can be filled with a wide variety of foam, soft rubber, cotton or other suitable supportive filling material. The materials may be odor resistant, moisture or water resistant, and contain anti-fungal chemicals.

For some individuals, no arch support pad 82, 84, and 86 is required and therefore not included in the kit 54. In some instances, a plurality of arch support pads 82, 84, 86, may be included that may be selected from the kit 54 and longitudinally aligned under the arch section 45 on the arch support member 44.

As shown in FIGS. 2, and 9-11, the arch support member 44 extends approximately ¾ the length of the lower foot bed 32. The arch support member 44 is made of semi-rigid material (plastic or fiberglass) and includes an upward curved longitudinal medial arch section 45 designed to bend or flex downward into a flat configuration and provide little upward resistant which is desirable for a low arch or flat-footed user. In the embodiment shown herein, three arch support pads 82, 84, 86 are furnished in the pad adjustment kit 54 are designed to fit under the medial longitudinal arch section 45 to resist bending in varying amounts for other user's with other arches. The three arch support pads 82, 84, 86 are made of cork or synthetic foam material and different thickness that impart different resistant properties so that the footwear may be used with different users with different arch profile. Also, each user may selectively adjust the amount of support provided to the arch support member 44 by exchanging the pad 82, 84, 86.

Figure 10:
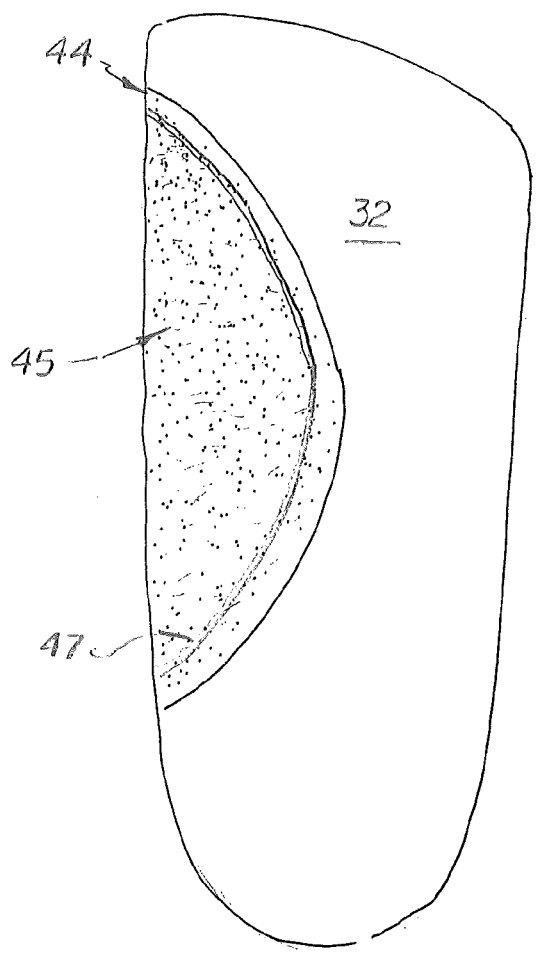
FIG. 10 is a bottom plan view of the arch support member shown in FIG. 9.
Figure 11:
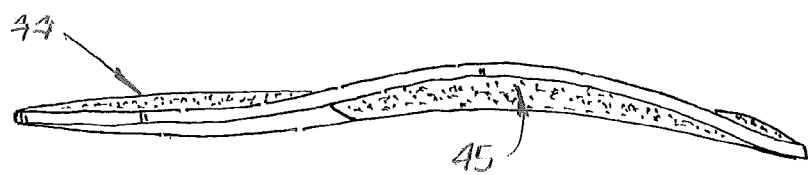
FIG. 11 is a medial side elevational view of the arch support member shown in FIGS. 9 and 10.

In one embodiment, shown in FIGS. 6 and 10, each arch support pad 82, 84, 86 is a small structure designed to fit under the arch section 45 of the arch support member 44. To prevent sliding of the pad 82, 84 or 86 under the arch support member 44, each pad 82, 84, and 86 may include a raised lip 83, 85, 87, respectively, which engage a complimentary-shaped gutter 47 formed on the bottom surface of the longitudinal arch 45 on the arch support member 44 (see FIG. 8). When properly placed under the arch support member 44, the raised lips 83, 85, and 87 and engage the gutter 47 and prevent slippage.

Figure 13:
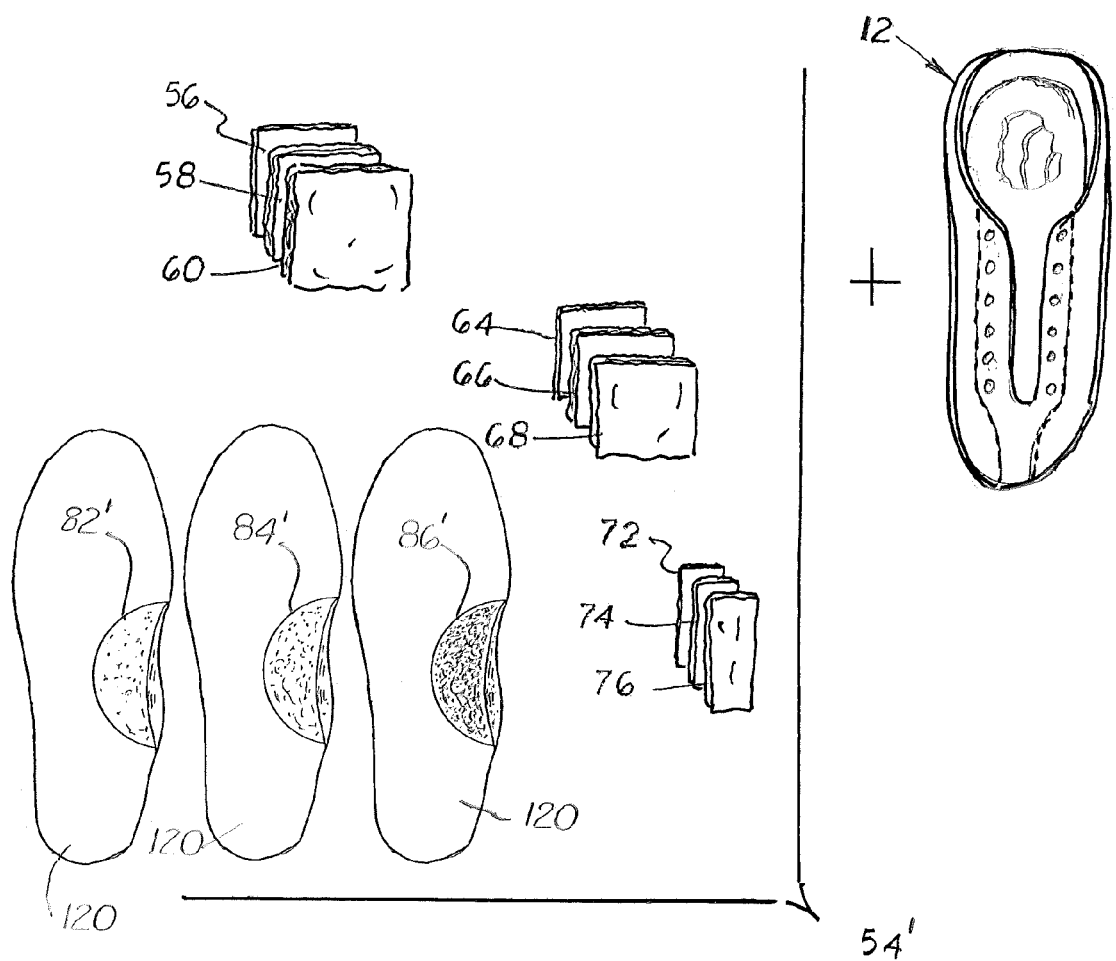
FIG. 13 is an exploded view of a shoe shell and its accompanying adjustment pad kit similar to the view shown in FIG. 6 in which the arch support pads shown in FIG. 6 are replaced by arch support pads integrally formed or mounted on a full length sole pad.
Figure 14:
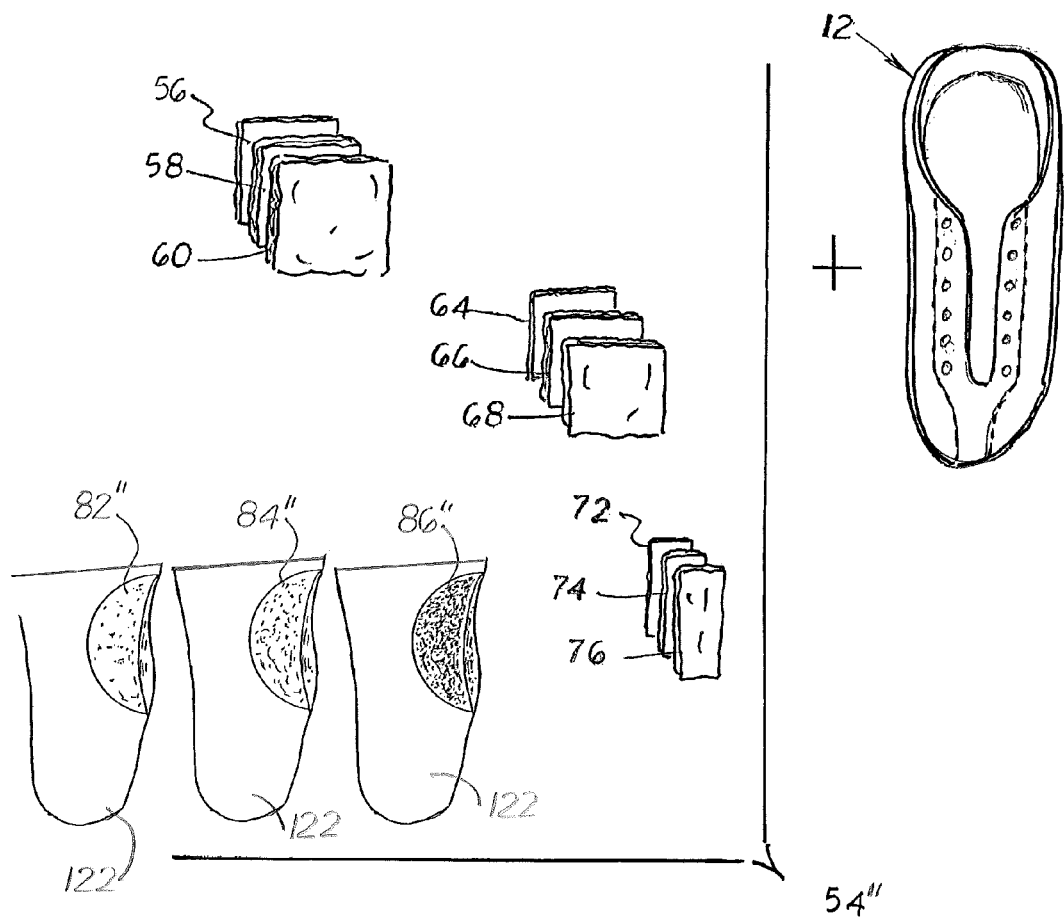
FIG. 14 is an exploded view of a shoe shell and its accompanying adjustment pad kit similar to the accompanying adjustment pad kit shown in FIG. 13 with the arch support pads being integrally attached or mounted on a ¾ length sole pad.

As shown in FIGS. 13 and 14, the three arch support pads 82, 84 and 86 may be replaced by two alternative arch support pads, denoted 82', 84', and 86', and 82", 84" and 86", which include an integrally formed full or ¾ length sole pad, 120, 122 respectively. The full or ¾ length sole pads 120, 122 are designed to resist movement and fits directly over the lower foot bed cover 40 and under both the forefoot pad 42 and the arch support member 44, or under only the arch support member 44.

Figure 15:
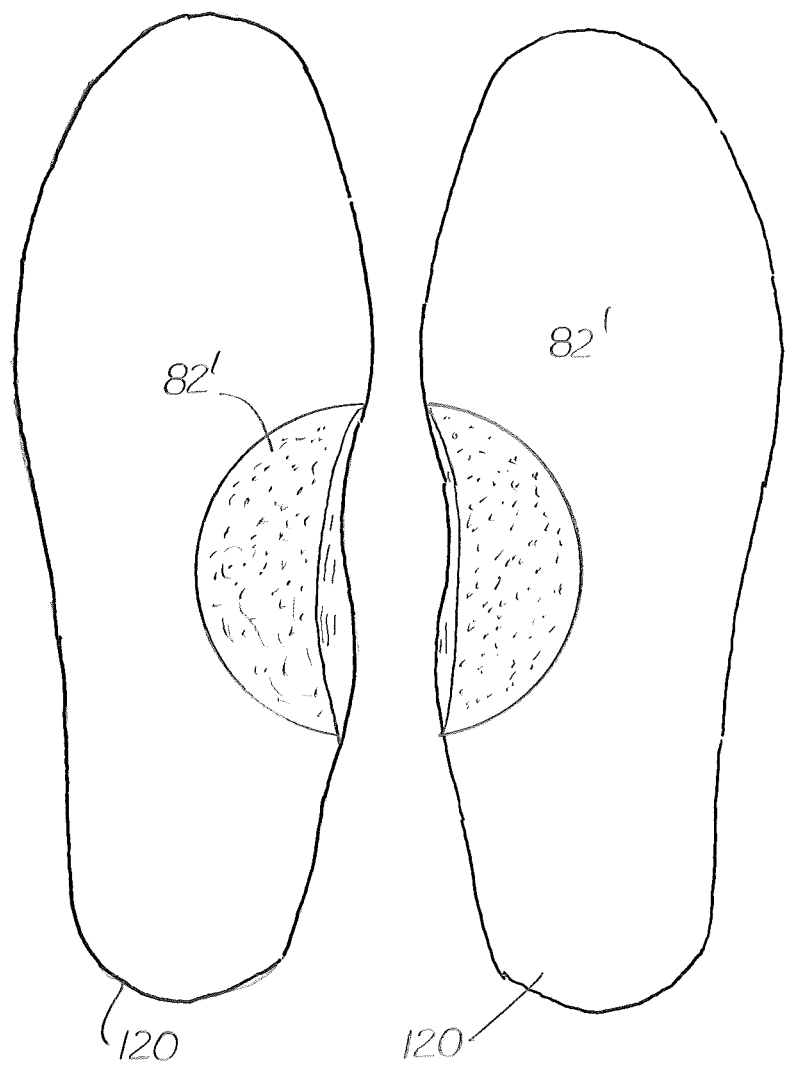
FIG. 15 is a top plan view of two arch support pads mounted on full length sole pads.
Figure 16:
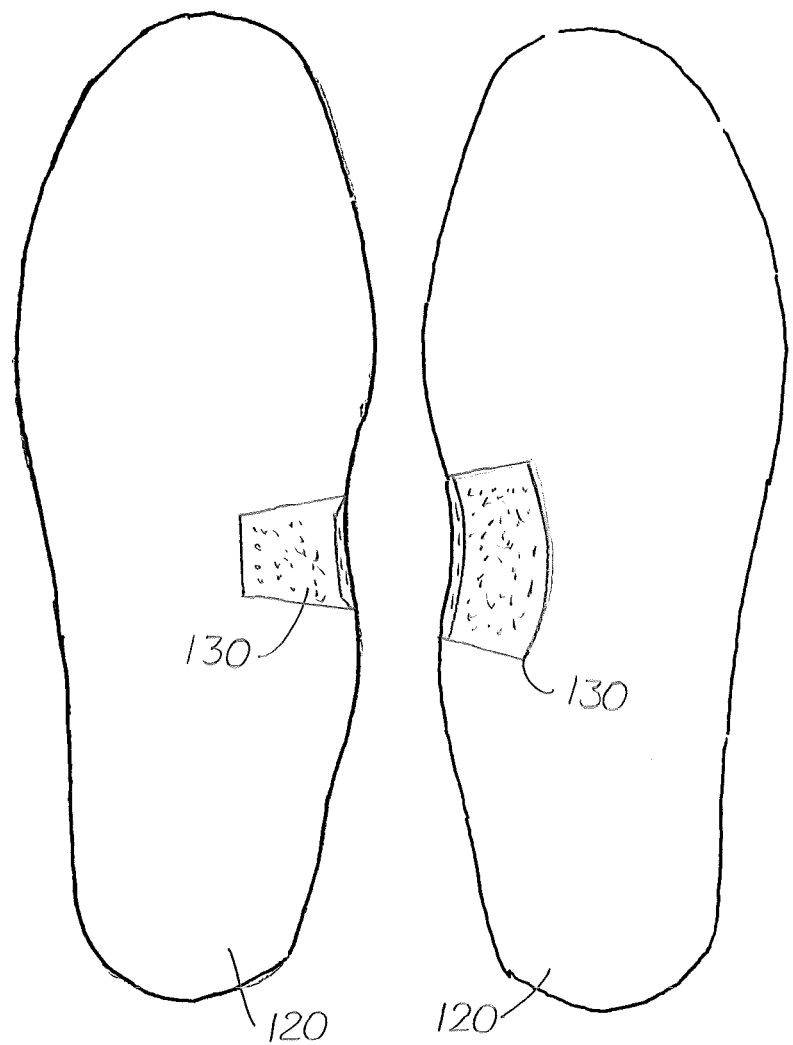
FIG. 16 is an alternative shaped arch support pads mounted on a full length sole pad.
Figure 17:
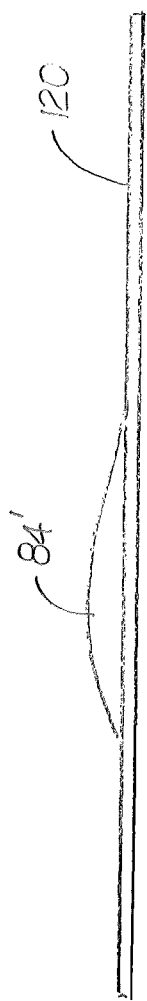
FIG. 17 is an side elevational view of the arch support pad shown in FIG. 15.
Figure 18:
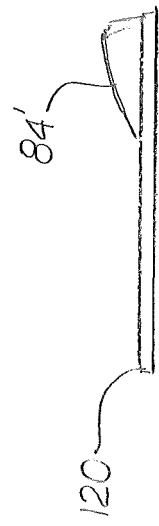
FIG. 18 is an end elevational view of the alternative arch support pad shown in FIG. 16.

FIG. 15 is a top plan view of two arch support pads 84' used on a pair of shoe shells. FIG. 16 is a side elevational view of one arch support pad 84' and sole pad 120, and FIG. 17 is an end elevational view of one arch support pad 84' and sole pad 120.

Figure 12:
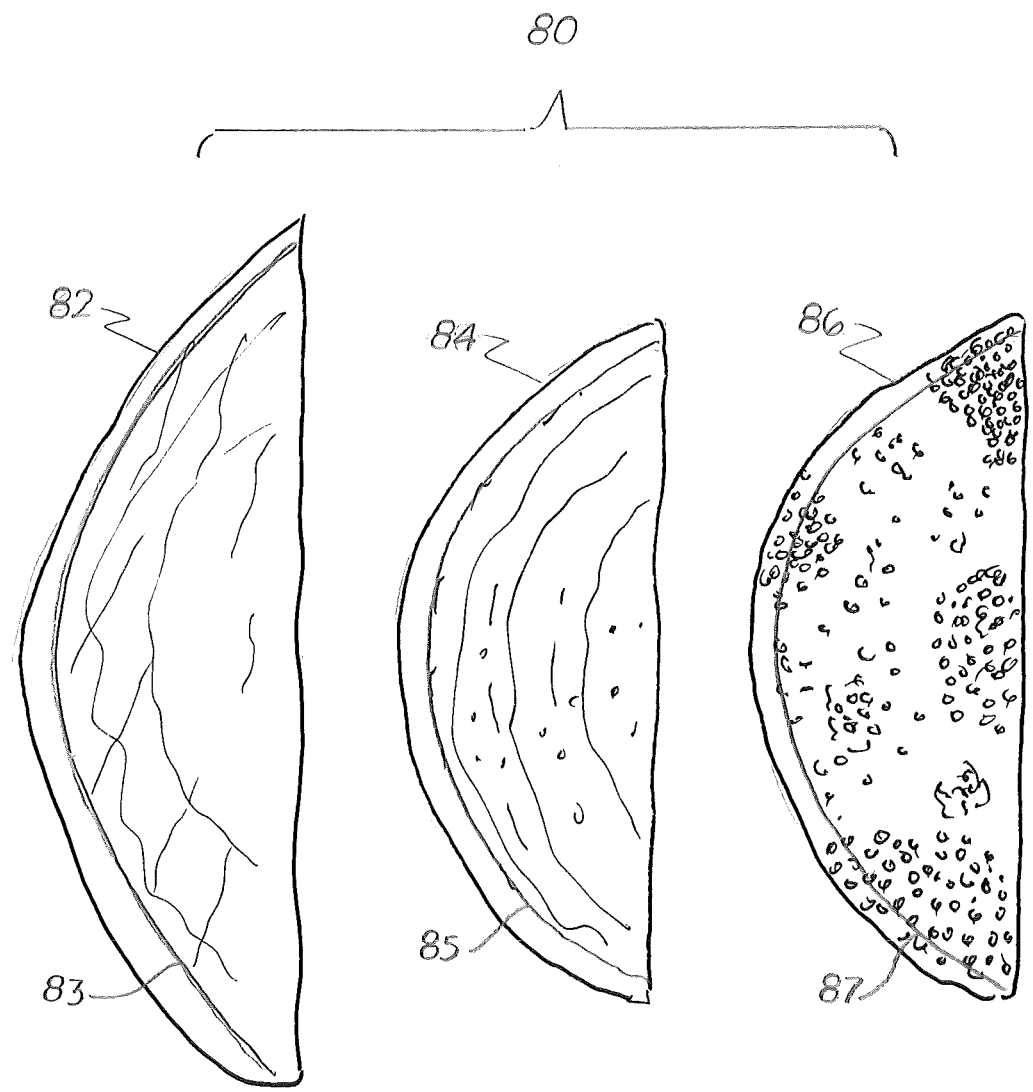
FIG. 12 is a top plan view of the three instep arch pads that may be used under the arch support member shown in FIGS. 9 and 10.

The arch support pads 82, 82', 84, 84', 86, and 86' shown in FIGS. 12-14 are beveled, semi-circular structures. In FIG. 16, and alternative arch support pads, denoted 130' are shown which are beveled, square or rectangular wedge-like structures that may be mounted or integrally formed on a full or ¾ length sole pads 120, 122.

Figure 19:
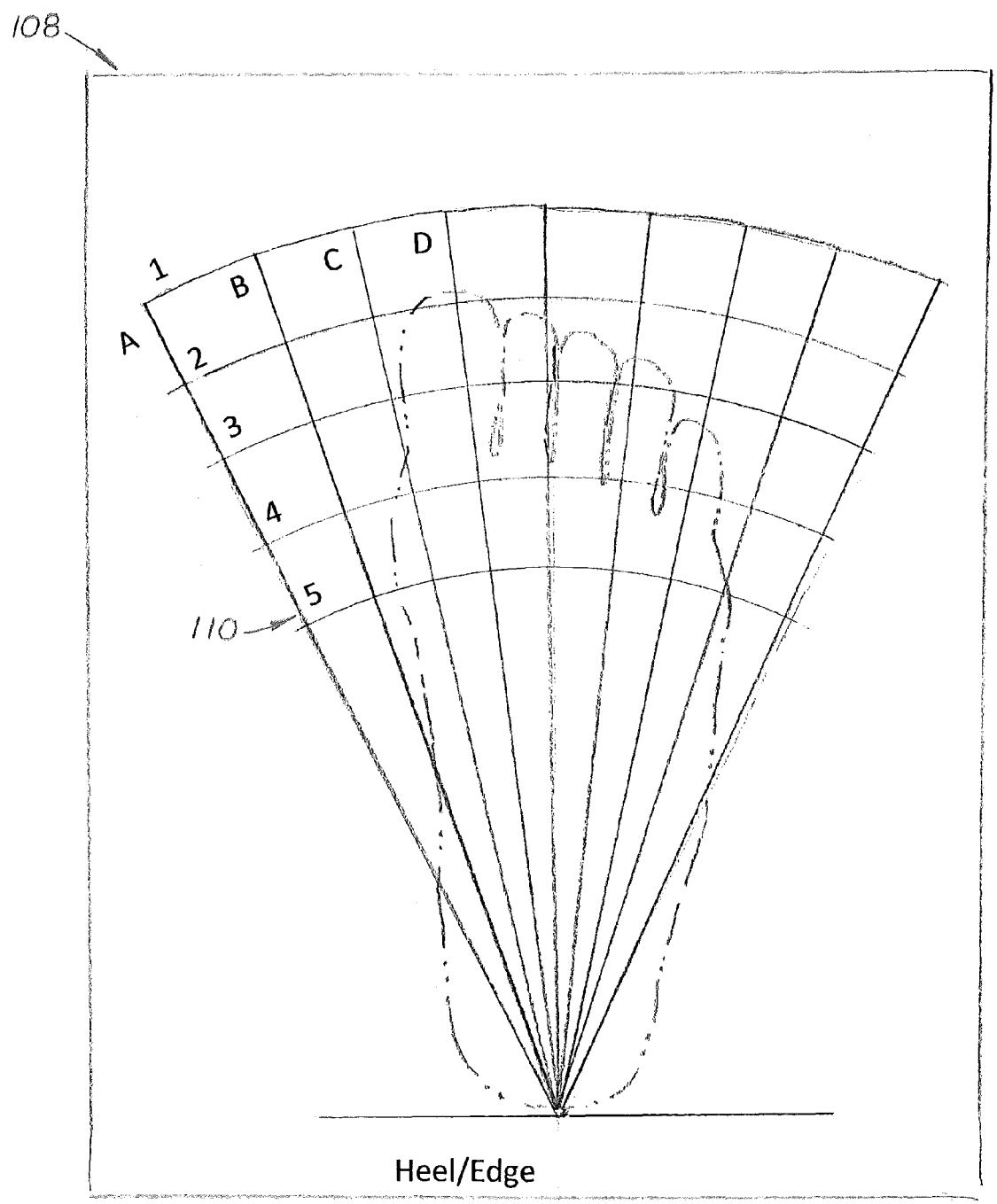
FIG. 19 is a diagram of the foot measurement graph showing the foot measurement scale printed thereon.

When a particular style of footwear 12 is desired, the customer 9 or 9' downloads and prints out from the website 16 to his or her printer 13 one or two foot measurement sheets 108 with a foot size graph 110 printed thereon, (see FIG. 19). The customers 9, 9' aligns his or her foot so that the posterior edge of each heel is aligned over the center axis and then reads the markings of the graph to determine the length of each foot. For the online customers 9, copies of the sheets 108 may be emailed or faxed with the order to the order fulfillment center 24. For more experienced customers, the two pieces of length information from the two sheets 108 are merely submitted with the order. For the retail store customer 9', the foot measure sheets 108 also may be faxed or brought to the store 19 and are presented or verbally communicated with the salesperson that then fills the order.

Using the above described footwear, a method of selling the footwear 12 is provided that includes the following steps: creation of a website 90 where a plurality of different styles and sizes of footwear 12 are sold. Each footwear 12 includes an outer shoe shell 30 with medial and lateral side pockets, 32, 43 a forefoot pad 42, a ¾ instep arch support pad member 44 and an upper foot bed cover 50. Each shoe shell 30 is distributed with a pad adjustment kit 54 containing a plurality of medial pocket pads 56, 58, 60, lateral pocket pads 64, 66, 68 and arch support pads 82, 84, 86. When a particular style of footwear 12 is selected on the website 90, the customer 9, 9' is instructed to download and print out a foot measurement graph 110 which the customer stands on and marks the length of each foot. A copy of each marked up foot measurement sheets 108 or the length number for each foot taken from the sheets 108 is then submitted with the customer's online fulfillment center or brought to the retail store. The order is then reviewed and the desired shoe shells 30 and adjustable pad kits are delivered to the customers 9, 9'.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. A customized, individually fitted footwear, comprising:
    a. a shoe shell configured to fit a foot of an individual, said shoe shell includes a lower foot bed;
    b. an arch support member inserted into said shoe shell and longitudinally aligned over said lower foot bed, said arch support member being made of semi-rigid material and includes an upward curved longitudinal medial arch section that provides upward resistance to supports the instep arch of a user when said footwear is worn, said arch support member includes a top surface with hook or loop material mounted thereon; and,
    c. a replaceable upper foot bed cover disposed longitudinally over said arch support member, said upper foot bed cover includes a lower surface with hook or loop material mounted thereon that connects to said hook or loop material on said top surface of said arch support member to temporarily hold said upper foot bed cover over said arch support member.

2. The footwear as recited in claim 1, wherein said arch support member is made of plastic or fiberglass.

3. The footwear as recited in claim 2, wherein said arch support member is a ¾ length size arch support.

4. The footwear as recited in claim 3, further including a fore foot pad located in front of said arch support member.

* * * * *